United States Patent [19]

Milling

[11] Patent Number: 4,628,311

[45] Date of Patent: Dec. 9, 1986

[54] CARRIER SENSE MULTIPLE ACCESS WITH COLLISION AVOIDANCE UTILIZING ROTATING TIME STAGGERED ACCESS WINDOWS

[75] Inventor: Philip E. Milling, Delray Beach, Fla.

[73] Assignee: International Business Machines Corporation, Armonk, N.Y.

[21] Appl. No.: 543,632

[22] Filed: Oct. 19, 1983

[51] Int. Cl.⁴ ............................................... H04Q 9/00
[52] U.S. Cl. .................................... 340/825.5; 370/85
[58] Field of Search ........................ 340/825.5, 825.51; 370/85, 94, 60

[56] References Cited

U.S. PATENT DOCUMENTS 4,232,294  11/1980  Burke et al. ...................... 340/855.5

4,395,710  7/1983  Einolf, Jr. et al. ............... 340/825.5

Primary Examiner—Donald J. Yusko
Attorney, Agent, or Firm—Sughrue, Mion, Zinn, Macpeak and Seas

[57] ABSTRACT

A network arbitration period following the termination of each transmitted frame is divided into a plurality of access windows which are assigned to respective stations in the network. Any station desiring to gain access to the network can acquire the network by transmitting during its assigned access window if no station assigned an earlier access window has already begun transmitting. The access window assignments can be rotated to equitably distribute access to the network.

9 Claims, 8 Drawing Figures

Microfiche Appendix Included
(2 Microfiche, 95 Pages)

REESTABLISHMENT OF NETWORK ACCESS ARBITRATION PERIOD

CARRIER SENSE MULTIPLE ACCESS WITH COLLISION AVOIDANCE UTILIZING ROTATING TIME STAGGERED ACCESS WINDOWS

This application is accompanied by a Microfiche Appendix of two microfiche having a total of 95 frames.

BACKGROUND OF THE INVENTION

The present invention relates to a multi-station data communications system, and more particularly to such a system in which all stations communicate with one another over a common transmission channel. The invention is still more particularly directed to a channel access protocol for use in a local area network (LAN) of data processing stations e.g., microcomputers.

In data communications systems, it is often the case that various stations within a system communicate with one another over a common communications channel, and in such cases it is necessary to establish some protocol for gaining access to the channel. A simple example is found in U.S. Pat. No. 3,484,771 issued on Dec. 16, 1969 to Falck, J. R. wherein a plurality of sensing stations in a burglar alarm system are connected by a common transmission line to a central office. Each sensing station includes circuitry for monitoring the busy or idle status of the transmission line. If the transmission line is occupied when a station desires to transmit to the central office, the station will continue to monitor the status of the transmission line and will delay the transmission of its signal until a predetermined period of time after the transmission line becomes idle. Such a technique may be acceptable for burglar alarm systems, but becomes unwidely and impractical in a more sophisticated data communications system wherein the volume of data transmission and the undesirability of delays dictate that the transmission medium should be used with maximum efficiently.

Additional examples of channel access protocols are found in U.S. Pat. No. 4,013,959 issued Mar. 22, 1977, to Patterson, and U.S. Pat. No. 4,234,952 issued Nov. 18, 1980, to Gable et al. In both of these systems, the transmission is monitored and the transmission of data is delayed until an idle transmission channel is detected. In the former system, the stations monitor the transmission medium for interference and repeat their attempts at preset intervals of time after each sensed interference until the message is successfully sent. In the latter system, the transmission terminals cut their transmissions short immediately upon detection of a collision, and the transmission is retried after a predetermined time delay if the medium is idle at the end of the delay time. Since the time at which each terminal in the latter system senses collision is a function of its distance from the nearest interfering terminal, the times for retransmission from each station will be effectively "displaced".

The subject of channel access protocol has become particularly significant in the field of microcomputers. With the increasingly widespread use of microcomputers, it is not uncommon for a particular office, company, plant, etc., to have a number of microcomputers all performing related functions at different locations, and in many cases there is a desire to connect the various microcomputers in a Local Area Network (LAN) to permit inter-computer communications. U.S. Pat. No. 4,063,220 issued Dec. 13, 1977 to Metcalfe et al., and U.S. Pat. No. 4,210,780 issued July 1, 1980 to Hopkins et al. describe channel access protocol systems for multiple computers communicating with one another over a common data bus.

The above-cited Gable et al., Metcalfe et al. and Hopkins et al. patents are all similar in that the communications channel is monitored for the presence of a data carrier and transmission is not initiated until an idle communications channel is detected. The transmitting station then continues to monitor the transmission channel to determine if a collision has occurred between its own transmitted data and data transmitted from another station. Such systems are known as Carrier Sense Multiple Access with Collision Detection (CSMA/CD), and have gained wide acceptance. However, while such systems do facilitate the successful transmission of data between stations, a substantial amount of time otherwise available for the exchange of data over the communications channel is lost whenever a collision occurs, and it would therefore be desirable to provide a system designed not only to detect collisions and orchestrate the retransmission of data but also to avoid collisions which may occur upon the initial transmission of data by different stations.

SUMMARY OF THE INVENTION

It is therefore an object of the present invention to provide a Carrier Sense Multiple Access (CSMA) system designed to avoid initial collisions between data transmissions from different stations.

It is feature of this invention that various stations in a communications network are assigned priorities for gaining access to the communications channel even before any collisions have occurred, with stations of higher priority being given an opportunity to gain access to the communications channel before stations of lower priority.

Briefly, the present invention is realized by reserving a period of time following each transmission for network access arbitration. An initial period of time following the end of each transmitted frame is reserved for a receiving station to sent its response or acknowledgment back to the transmitting station, and the period of time following this reserved response period is divided into individual time slots, or access windows, which can be assigned to each of the stations in the network. The stations are each assigned an access window number dictating the priority with which each particular station can gain access to the communications channel, with higher priorities corresponding to the earlier access windows and lower priorities corresponding to the later access windows.

When each particular station's access window occurs, the station monitors the communications channel to determine if it is active. If the channel is not active, the station will begin transmitting, and this will cause the carrier sense to become active at all other stations to indicate that the channel has been seized.

The assigned access window numbers can be rotated to give all stations substantially equal access to the channel, and in one preferred embodiment the rotation of access window assignments can be easily achieved by maintaining an access window number for each station and decreasing the access window number i.e. (increasing the assigned priority of that station) by one position upon each transmission by any station in the network. It would also be possible to assign the access window priorities on a pseudo-random basis.

If the network arbitration time period has expired since the end of the last data transmission, any station desiring to transmit a frame of data can send a predetermined bit pattern e.g. all 1's, onto the transmission channel for some limited period of time, e.g. 150 microseconds. This will cause the carrier sense to become active at all stations, and the network arbitration period will begin anew at the termination of this initializing transmission.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENT

The present invention is an improvement in the type of CSMA/CD systems described above, and will hereinafter be referred to as a CSMA/CA system, where "CA" stands for Collision Avoidance. Not only does the channel access protocol of the present invention detect collisions between data transmissions and orchestrate the retransmission thereof, but the individual stations in the network are each assigned priorities for attempting to gain access to the communications channel, thereby substantially decreasing the frequency of collisions and enhancing the overall efficiency of the system.

The preferred embodiment of the invention is intended for use in a communications system wherein all transmitted frames are acknowledged. An initial period of time (hereinafter referred to as a "response access time") following the end of a transmitted frame is reserved for use by the receiver of that frame to send a response back to the transmitting station, or source node. The time following the response access time is subdivided into equal access windows, one for every possible node on the network, and every node is assigned a different access window.

Since the response access time is of known duration, and since the respective access windows are also of known durations, each network on the node can caculate the time from the end of a frame to its own access window. Upon detecting a transmission on the communications medium, each station will load a counter with a value corresponding to the time to its respective access window, and the counter will begin counting when the end of the transmitted frame occurs. When the timer indicates that the access window of a particular station has arrived, an interrupt handler routine at that station examines a flag to determine if the station is requesting access to the network. If access is being requested, the station then checks to see if its carrier sense is active, i.e., if another node has already reached its access window and begun transmitting. If the network is still idle, the node will begin transmitting. If the transmit shift register is presently empty, the node can begin its transmission with all 1's so that the carrier sense will become active at all other nodes and this will be immediately followed by the data to be transmitted. The timing counter will also be reloaded with a count corresponding to the time remaining until the end of the network access arbitration period, so that the end of this synchronized period can be determined.

Figure 1:
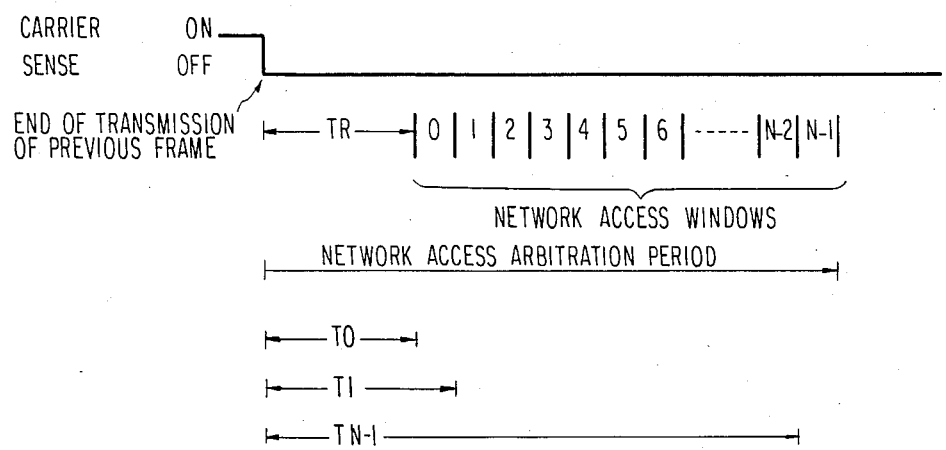
FIG. 1 is a timing diagram illustrating the network access technique of the present invention.

The normal collision avoidance procedure of the present invention is simply illustrated in FIG. 1. At the end of transmission of a previous frame, the carrier sense at a particular station will go off, and a response access time TR of, e.g., 200 microseconds, is reserved for the receiving station to send its acknowledgment or response. The remainder of the network access arbitration period is divided into N network access windows, where N is the maximum number of nodes or stations which may be connected to the network. A suitable access window duration may be approximately 40 microseconds, so that, for N=64, the total duration of the network access arbitration period may be approximately 2.8 ms. A node assigned the highest priority network access window 0 will commence its transmission at time T0 in FIG. 1, the node assigned the access window 1 will commence transmission at time T1, and so forth. The transmission by a particular station will cause the carrier sense at all other stations to become active during subsequent network access windows, thereby preventing any other station from seizing the communications channel.

Figure 2:
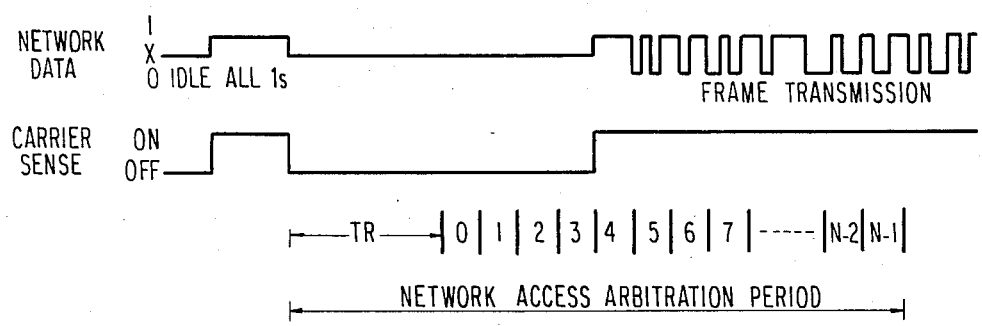
FIG. 2 is a timing diagram illustrating the re-establishment of the network arbitration period in the system according to the present invention.

FIG. 2 illustrates the procedure followed in the system according to the present invention when the network access arbitration time period has expired and no station has attempted to seize the channel. In such a case, when a station desires to transmit a frame and the network remains idle, that station will transmit all 1's for a period of about 150 μs to cause the carrier sense to become active at all nodes in the network. This will re-establish the network access arbitration period, and all nodes will be synchronized to the time that the carrier sense makes the transition from active to inactive at the end of the 150 μs transmission. All nodes desiring to transmit may then wait for their respective access windows to be reached and begin transmitting if the network is still inactive. In the illustration of FIG. 2, a particular station having been assigned access window 4 desires to transmit a frame but the network access arbitration period has already ended. The node will then transmit all 1's onto the network for a short period of time so that carrier sense will be activated at all nodes on the network. This particular node will then wait for its access window number 4 to arrive and, if the carrier sense is still inactive, the node will begin transmitting its frame from the point of its access window. All other nodes must then wait for this transmit activity to end and for a new network access arbitration period to be established.

To achieve fairness with respect to access of the network by all stations, the present invention employs a technique of reassigning access windows after each transmission. Each station has a corresponding unique network address, and a network access "token" byte is transmitted in the control header of each transmitted frame. Upon transmission by any station, the network access token included in the transmission is received at all other nodes and added modulo N (where N is the maximum number of nodes) to the network address of that station. The calculation result will be used as the new access window number for that station, and the transmitted token can be decremented before each transmission to achieve the effect of rotating access priorities. The access window number of each node awaiting access to the network will decrease with every frame transmitted until access window 0 is reached, followed by access window N-1. Lower access window numbers correspond directly to higher access priority.

A variation which provides for shorter access times is to vary the network access token in a pseudo-random manner, i.e., to compute the next token from the current token by means of a pseudo-random sequence which cycles through all N node addresses during every N transmit frame times. This will reduce the possibility of a busy node capturing many consecutive frames while other nodes are waiting for access to the network.

For networks having less than the maximum number of N nodes, enhanced collision avoidance may be realized by distributing the access windows amongst the various stations. For example, node addresses may be assigned in numerical order starting with address 0, and a "scrambled" node address may be computed at each node by reversing the order of bits in the node address. For M actual nodes in a network that supports N nodes, where M<N, there will be approximately N/M positions between consecutive "scrambled" node addresses. Each node's network access window can be computed by adding its scrambled node address modulo N to the current network access token. The effect of this technique will be to provide greater separation between the access windows of the different nodes, thereby substantially reducing the possibility that a node will seize the communications channel before it has had sufficient time to detect the seizing of the channel by a higher priority station.

In order to further reduce the possibility of collision, a node which has just been activated, or initialized, should be required to wait for two complete network arbitration periods before transmitting, thereby reducing the possibility that a node will attempt to seize the communications channel and commence transmission of data without being aware of the status of the communications channel during the immediately prior network access arbitration period.

Despite the steps taken by the present invention to avoid collision, there may still be a few instances in which collisions will occur, e.g., where one station fails to properly receive the latest transmission and does not update its token value so that two stations "think" they have the same access window. In the rare event that a collision does occur, frame transmission will be aborted at each station, and, after waiting for its respective access window, each station will retransmit its frame. The first two bytes of a frame are read by the sender, and a collision is assumed if these two bytes are not correct. Also, if a response is not received from a destination station within the response access time TR, the frame will be retransmitted with up to eight retries possible.

Figure 3A:
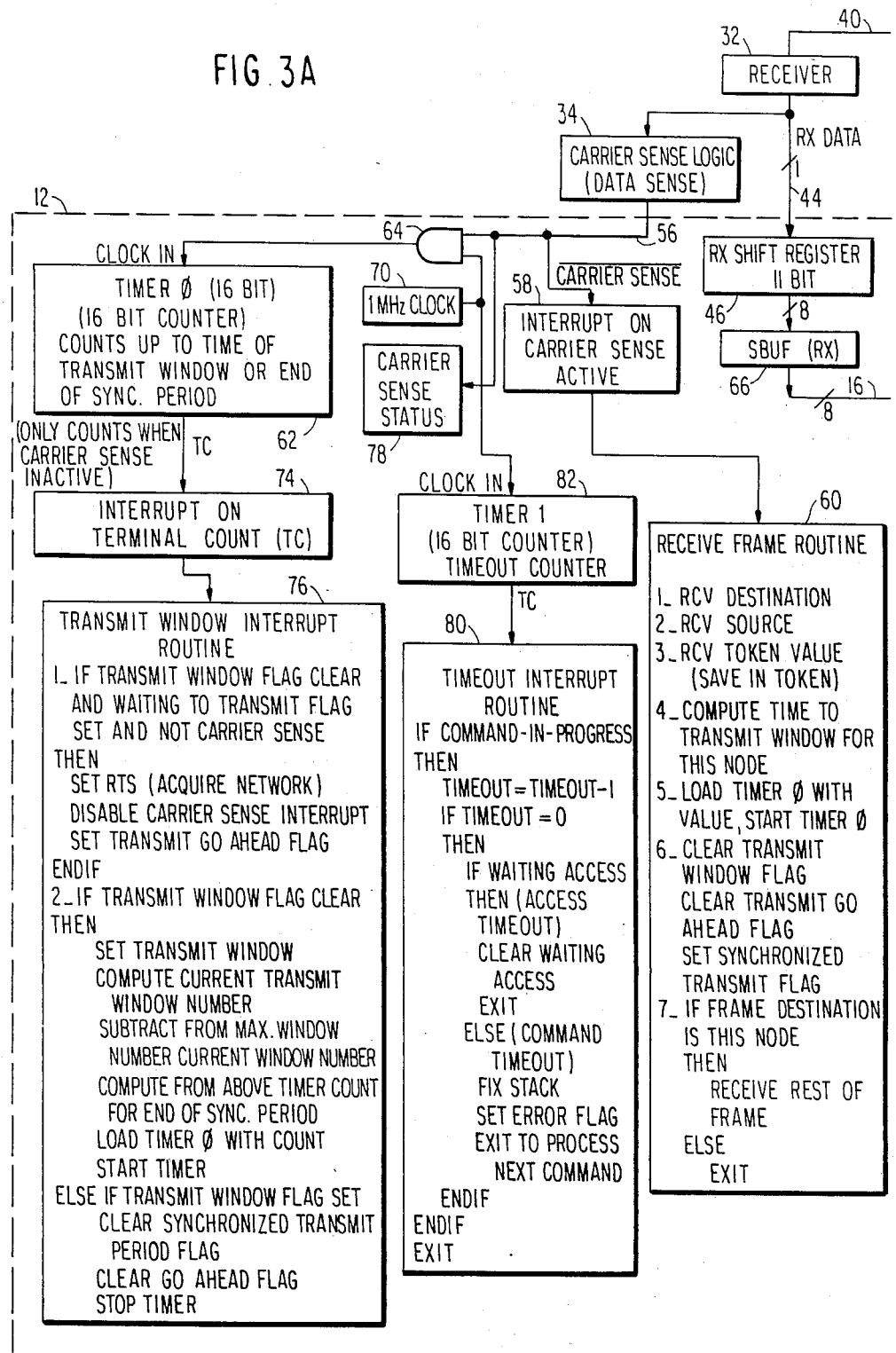
FIGS. 3A and 3B are a diagram of essential components of the network arbitration system of the present invention.
Figure 3B:
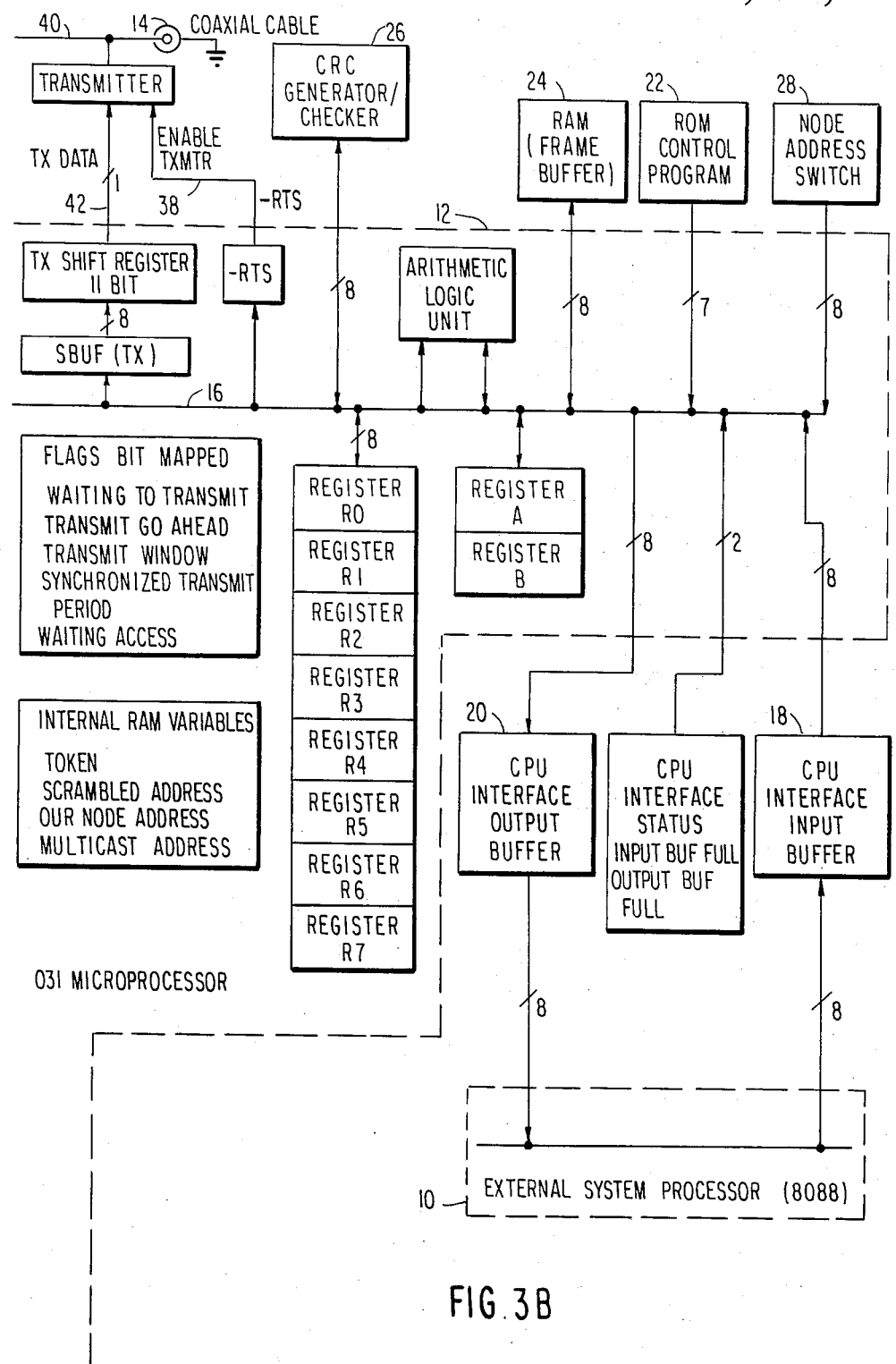

Turning now to FIGS. 3-5, the construction and operation of the invention will be described in more detail. As shown in FIGS. 3A and 3B, each station in the network includes an external system processor 10, e.g., the Intel 8088 Microprocessor used in the IBM Personal Computer (PC), and a network access arbitration microprocessor, e.g., and 8031 microprocessor available from Intel Corporation, serves as a network access interface between the external processor 10 and the transmission medium 14, e.g. a coaxial cable, shared by all stations in the network. The external processor 10 is connected to an internal bus 16 of the interface processor 12 via CPU Interface input and output buffers 18 and 20, respectively, and a CPU interface status signal is provided to the internal bus 16 in a known manner to indicate whether the interface input or output buffers are full. The network access processor 12 is also provided with an external ROM for storing a control program pertinent portions of the assembler listings of an example of a suitable control program being set forth in the microfiche deposited with the U.S. Patent and Trademark Office, an external RAM to serve as a frame buffer for storing data to be transmitted from the external processor 10 to the network cable 14 and for storing data received from the cable 14, a Cyclic Redundancy Code (CRC) generator/checker 26, and a node address switch 28 which designates the network address of the particular station and is externally settable by a system operator.

Figure 4A:
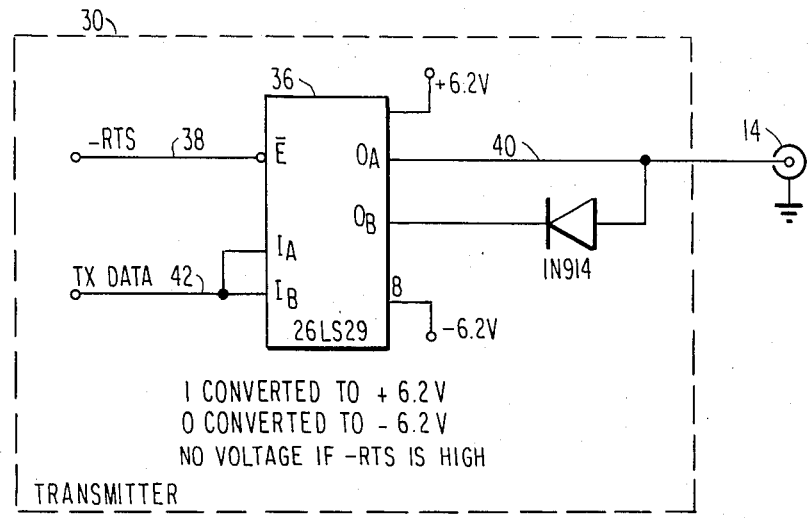
FIGS. 4A and 4B are brief diagrams of various hardware components, with FIG. 4A illustrating the transmitter of FIG. 3B, and FIG. 4B illustrating the receiver and carrier sense logic of FIG. 3A.

The network access processor 12 is connected to the transmission cable 14 via a transmitter 30, receiver 32 and carrier sense logic 34. The transmitter 30 may be essentially as illustrated in FIG. 4A, including a single-ended line driver 36 of the RS423 three-state type available from a number of manufacturers under the part number designation 26LS29. When the -RTS (Request To Send) signal on line 38 is at a high level, no voltage will be present on the output line 40. At all other times, a "1" on line 42 will be converted to a positive signal voltage on line 40 and a "0" on line 42 will be converted to a negative signal voltage on line 40.

Figure 4B:
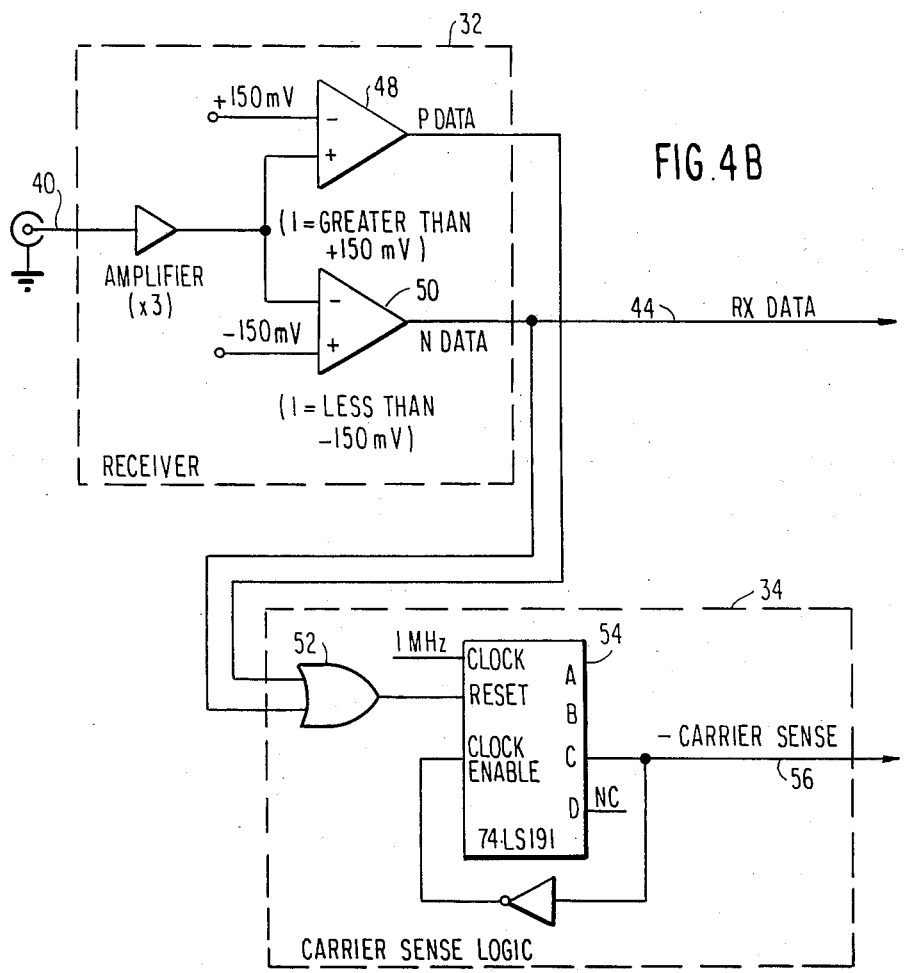

The receiver 32 and carrier sense logic 34 may be essentially as illustrated in FIG. 4B, with a positive data signal being recovered when the signal on line 40 exceeds +50 mV and a negative signal being recovered when the signal level on line 40 is less than -50 mV. The recovered data is then provided over line 44 to the received shift register 46 (FIG. 3A).

The outputs from comparators 48 and 50 are provided in common to OR gate 52 in the carrier sense logic 34. The carrier sense logic 34 may include a 74LS191 binary counter available from a number of manufacturers. The counter may be connected as shown such that it receives a 1 MHz clock signal at its clock input and is periodically reset by the occurrence of either a positive or negative data signal on the transmission line. As long as data is present on the transmission line, the counter 54 will be repeatedly reset and the value in counter 54 will never reach the point at which a high level output is provided from output terminal C. During a prolonged absence of data on the transmission line, however, the absence of any reset signal will allow the count value to accumulate until a high level signal appears on the "-CARRIER SENSE" line 56.

Before describing the operation further, it should also be noted that the network access processor 12 has a number of bytes of internal RAM, e.g. 128 bytes for the Intel 8031 processor, which can be used to store certain variables, to store flag values, for use as scratch pad buffer, etc. The first eight bytes may comprise registers R0-R7 in FIG. 3B, and additional bytes may be used to store the current token value, the network address (designated by the switch 28), a "scrambled" version of the network address and a multicast address. The multicast address is an address which may be shared by a plurality of stations which may all be intended to receive certain transmissions. This is in addition to the broadcast address in response to which all stations will receive a transmission. Thus, by assigning the same multicast address to groups of stations on the network, a type of "broadcast" transmission to less than the entire network may be permitted.

In the preferred embodiment, there are up to 128 stations on the network, and the network addresses of the stations are numbers between 0 and 127. The broadcast address for all stations on the network will be 255, and the multicast addresses may be in the range of 128–254.

A number of internal RAM bytes are bit mapped, and these bytes can be used to keep track of flag states such as a "waiting access" flag the set value of which indicates that a station is waiting to gain access to the network, a "waiting to transmit" flag the set value of which indicates that a station awaiting access has taken care of certain pre-transmission housekeeping procedures and is only awaiting its access window to begin transmission a "transmit go ahead" flag having a set value which indicates that the network has been acquired and which enables the station to commence transmission of data, a "transmit window" flag having a set value which indicates that the assigned access window has passed, and a "synchronized transmit period" flag having a clear value which indicates that the end of the network access arbitration period (synchronization period) has passed.

The 8031 processor also includes registers A and B, with register A typically being designated as an accumulator.

As described earlier, an essential feature of the present invention is the allocation of access windows during a network access arbitration period immediately after the end of a transmitted frame. The description of the operation of the invention will therefore begin with the reception of data.

When data is received over the transmission line 14, the $\overline{\text{CARRIER SENSE}}$ signal on line 56 is low and an interrupt 58 is triggered. In response to this interrupt, the network access microprocessor 12 performs a receive frame routine illustrated at 60 in FIG. 3A. First, the destination of the received frame is examined to see if the rest of the frame should be received at this particular station. The source of the frame is also examined so that an acknowledgement can be sent back if necessary.

The token value included in the control header of the frame is received and stored. The access control processor 12 then uses the token to calculate the time that will elapse between the end of the currently transmitted frame and the beginning of the access window assigned to this station. The calculation is preferably performed in two steps. First, the access window number is determined by combining the token with the network address in some manner. One technique, e.g., for a network of 128 nodes, would be to add the token value to the network address modulo 128. In performing the calculation, the token value is loaded into register A and the scrambled address (obtained by inverting the seven least significant bits of the network address) is then added modulo 128 to the contents of register A. The result will be the new assigned access window number.

If desired, the token value can be decremented by two or more at each transmission to increase the speed with which the access window assignments are rotated. A side effect of this technique, however, would be that some stations would never be able to obtain the highest priority access window assignment.

After the access window number is determined, the second step is to calculate the time which will elapse up to the access window. To do this, a value representing the number of access windows equivalent to the response access time TR in FIG. 1 is added to the access window number already stored in register A. For example, for a response access time of 200 μs and for a system such as described above wherein the access interval is divided into 128 windows of 20 μs each, a value of 10 will be added to the register A. This will result in a number representing the number of equivalent access window time periods from the end of the transmitted frame to the assigned access window. The register B is then loaded with a value representing the duration of each access window, and registers A and B are multiplied to obtain a value representing the time to the access window.

The access window duration number loaded into register B preferably expresses the duration of the access window in terms of the number of clock pulses at a predetermined frequency, e.g., 1 MHz clock pulses. The 1's complement of the product is taken, since the timing counter will be a count-up counter, and this 1's complement value is then loaded into the counter 62 which may be any one of a number of commercially available, presettable counters. The counter 62 is enabled during the receive frame routine 60, but it only receives the 1 MHz clock signals through AND gate 64 and therefore does not begin counting until the end of the transmitted frame at which time the signal $\overline{\text{CARRIER SENSE}}$ goes high.

Continuing in the receive frame routine, the transmit window flag is cleared to indicate that the assigned transmit window has not yet occurred, and the transmit go-ahead flag is also cleared to indicate that the station has not yet acquired the network. The synchronized transmit flag is set to indicate that the synchronized transmit period, or network access arbitration period, has not yet ended. Finally, if the received frame destination coincides with the network address of this station, either the individual address or the multicast or broadcast addresses, the remainder of the frame is received and passed through the receive buffer 66 and stored in RAM 24. If appropriate, a response will be immediately sent back to the sender. The data buffered in RAM 24 is transferred through CPU interface output buffer 20 to the external processor 10. If the address does not coincide with an address of the present station, the remainder of the frame is ignored. Note, however, that the new token value has already been received, stored and used in calculating the access window timing.

When the transmitted carrier ends, the timer 62 begins counting 1 MHz clock signals from the clock source 70 through AND gate 64. When the counter has counted a number of pulses corresponding to the time to its access window, a terminal count (TC) output on line 72 causes an interrupt 74 to be triggered. The access control processor 12 then performs a transmit window interrupt routine illustrated at 76 in FIG. 3A.

The transmit window interrupt routine is performed in two steps. In the first step, the transmit window flag and waiting to transmit flags are examined to see if they are cleared and set, respectively. The transmit window flag will have been cleared in the receive frame routine 60 as described above, and should still be cleared to indicate that the assigned access window has not yet passed. The waiting to transmit flag will have been set in the PROCESS TX FRAME routine, illustrated in FIGS. 5A and 5B and to be described later, if this station desires to transmit data onto the network. If these flags are cleared and set, respectively, and if no carrier is currently being detected as indicated by the carrier sense status register 78, the access control processor 12: (1) sets the RTS register so that $\overline{\text{RTS}}$ on line 38 in FIGS. 3B and 4A will be low, thereby enabling the transmitter (all 1's will be sent whenever the TX shift register is empty), (2) disables the carrier sense interrupt so that it will not begin the receive frame routine in response to its own transmission, and (3) sets the transmit go-ahead flag to indicate that it has gained access to the network and can begin transmitting its data.

In the second step of the transmit window interrupt routine, the access processor 12 examines the transmit window flag to see if it is still clear. It should be noted that the second step is performed regardless of whether the first step criteria were satisfied. The first part of this second step is designed to indicate that the assigned access window has passed, and this is done by setting the transmit window flag. The access control processor 12 then calculates how many access windows remain until the end of the synchronization period and how much this time this corresponds to, and loads into the counter 62 a value such that the timer counter 62 will provide a Terminal Count (TC) output at the end of the synchronization period. The counter is then enabled and, assuming that no carrier is currently being detected on the transmission line, begins counting pulses received through AND gate 64.

If the access control processor 12 finds in the second step of the transmit window interrupt routine that the transmit window flag is not clear, i.e. it has already been set, the processor knows that the TC output from the timer signifies the end of the synchronization period. In this case, the synchronized transmit period flag is cleared, the transmit go-ahead flag is cleared, and the timer is disabled.

FIG. 3A also illustrates at 80 a timer interrupt routine, the purpose of which is to prevent the access control processor 12 from hanging up on any given command or while awaiting access to the network. A timeout value is maintained in internal memory and is set at about 13 seconds while the station is awaiting access, since this should be more than enough time for the carrier sense to become inactive and for the network to be seized by this station. At all other times, the timeout value is set at a value corresponding to a much longer time, e.g., approximately 2.5 minutes, beyond which the processor is considered to be "stuck" on a given command.

The timeout interrupt routine operates as follows. The timer counter 82 continuously counts 1 MHz clock signals from clock source 70 and provides periodic TC outputs. For a 16-bit counter, the TC outputs will occur approximately every 65 ms. At each TC output from counter 82, the access control processor 12 looks to see if a command is in progress. If not, no action is taken. If a command is in progress, the timeout value in the processor memory is decremented by 1 and the new timeout value is examined to see if it is 0. If not, the routine is ended and repeated at the next TC output from the counter 82.

The successive decrementing of the timeout value continues as long as the same command is still in progress. When the timeout value reaches 0, and if the waiting access flag is set, the routine clears the waiting access flag and a "busy" indication will be sent back to the external processor 10. If the waiting access flag is not set, it is considered a command timeout and the processor sets an error flag while advancing to the next command. The timeout value is reset to its appropriate value each time execution of a new command is begun.

Figure 5A:
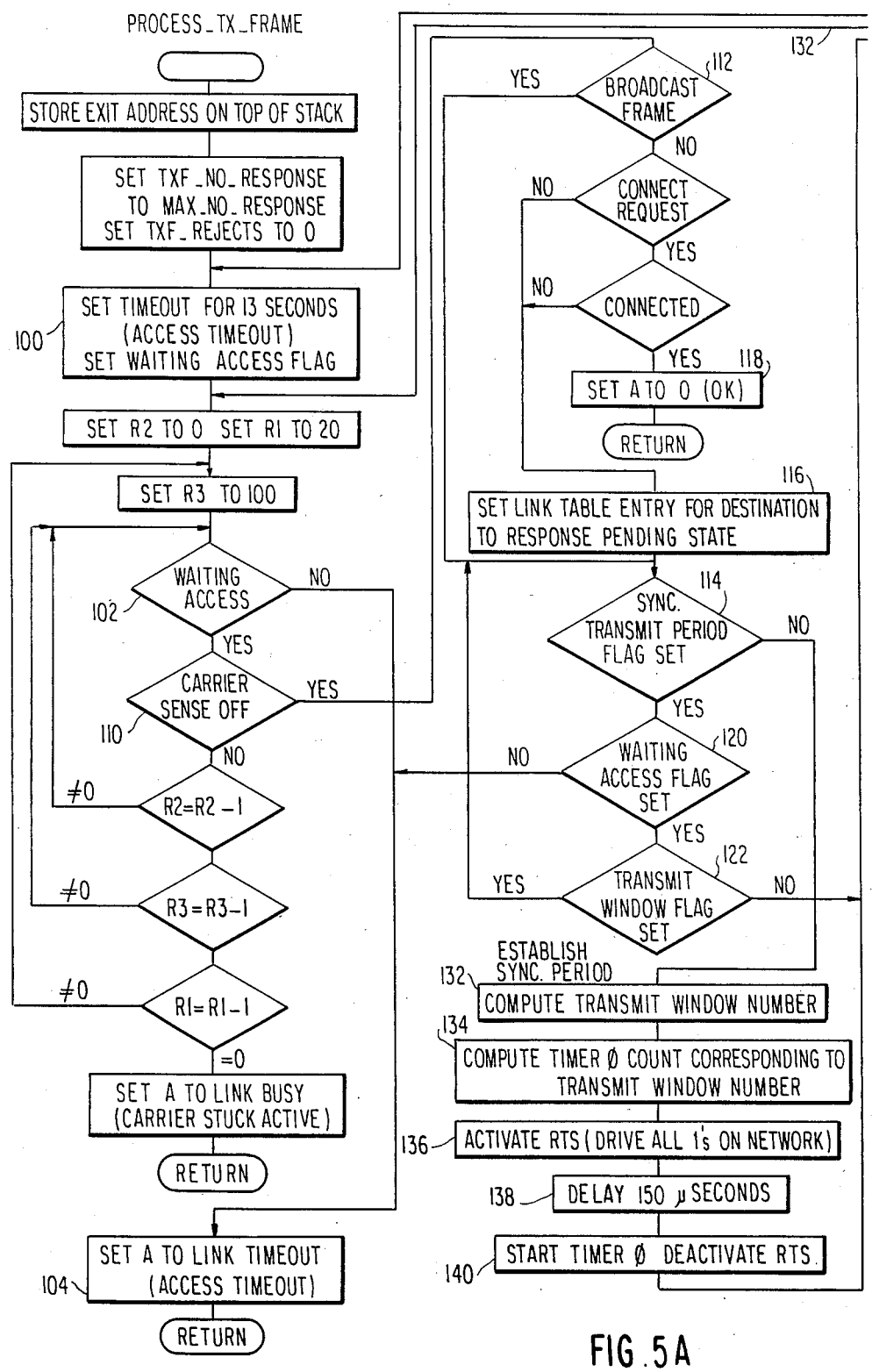
FIGS. 5A and 5B are a flow chart of a transmit frame process routine which may be followed at each station when access to the communications channel is desired.
Figure 5B:
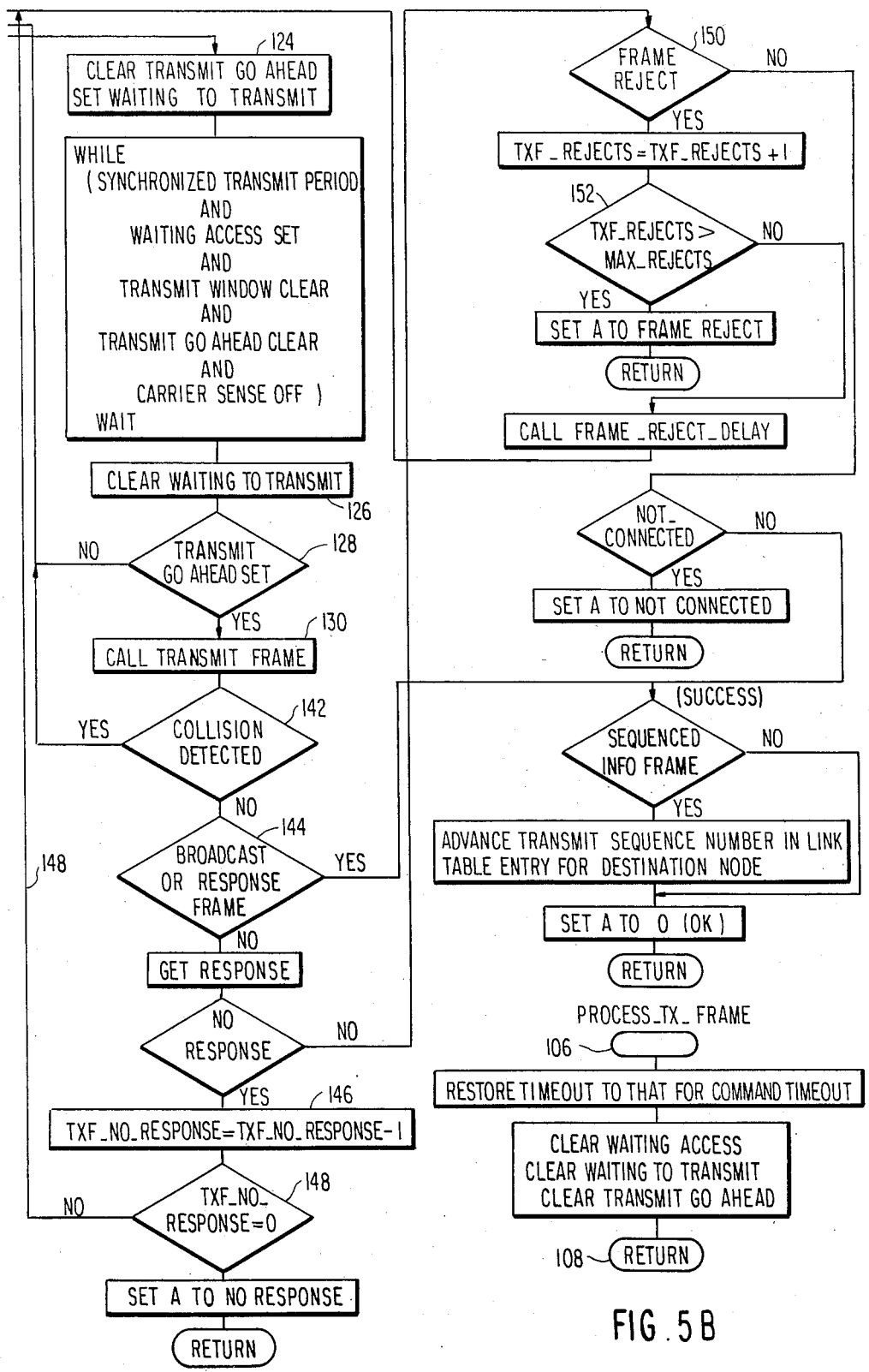

FIGS. 5A and 5B illustate a flow chart of the essential steps in a PROCESS TX FRAME routine performed by the access control processor 12 whenever the external processor 10 signals that it desires access to the network. The processor 12 first stores on top of its stack the address to which the program should jump whenever a RETURN is called for, as is known in the art. A register value TXF NO RESPONSE in internal memory is set to a value MAX NO RESPONSE corresponding to the maximum number of times the node will be permitted to transmit without receiving a response from the destination node. A register value TXF REJECTS indicating the number of times a transmission has been rejected by the destination station is set to 0.

In step 100, the processor then sets its timeout value at approximately 13 seconds and sets the waiting access flag to indicate that the station is awaiting access to the network. The timeout value is set at 13 seconds while the station is awaiting access to the network, since this should be more than sufficient time for the station to obtain access. At all other times, the timeout value is set at a larger value so that the access control processor 12 will not hang-up when processing any given command. The timeout value is used in the timeout interrupt routine shown briefly at 80 in FIG. 3A and described above.

After setting the waiting access flag, the registers R2, R1 and R3 are set to 0, 20 and 100, respectively, and the processor then examines the waiting access flag. If it has not been cleared since step 100, e.g., by the timeout interrupt routine, the carrier sense status in register 78 is examined to see if the network is presently inactive. If not, the value in register R2 is decreased by 1 and the waiting access flag is again examined at step 102. Assuming that the carrier sense remains active for an extended period of time, the value in register R2 will be continually decreased until it again reaches 0, at which time the value in register R3 will be decreased by 1. Register R2 will again be cycled through, and register R3 will then be decreased again to a value of 98. This will continue until register R3 is decreased to 0, at which time R1 will be decreased by 1 to a value of 9, and the cycle through registers R2 and R3 will continue. Assuming R2 to be an 8-bit register, the carrier sense will be examined approximately 512,000 times, requiring approximately 2 seconds, and the register A will be loaded with a "link busy" indication to be sent back to the external processor 10.

If at any time during this process the 13 seconds permitted by the timeout interrupt 80 elapses, the waiting access flag will be cleared and the timeout indication will be loaded at step 104 into the register A.

In either the "link busy" or access timeout cases, the program will "RETURN" to the address corresponding to the program location 106 in FIG. 5B, at which time the processor 12 will complete some housekeeping tasks such as restoring the timeout value to the 2.5 minute value for command timeout, and making sure that various flags are clear. The processor will then return at step 108 to the program which originally called up the PROCESS TX FRAME routine.

If the carrier sense becomes inactive before timeout occurs, the routine will advance from step 110 to step 112 to determine if the access request is for a broadcast frame. If so, no response from a destination station will be expected and the routine will advance to step 114.

If the station desires access to the network merely to send a connection request, and if a connection has already been established so that the connection request is not necessary, the routine sets the register A, at step 118, to a value indicating "OK", and the PROCESS TX FRAME routine is exited via steps 106–108 in FIG. 5B.

In all other cases, the program advances to step 116 where the link table is updated. The link table may comprise a section of the external RAM with one byte for each possible destination on the network. The byte corresponding to the destination of the requested transmission will then be updated to indicate that a response from that destination is pending.

After determining that the access request is due to a broadcast frame or after performing any necessary link table updating in step 116, the routine then advances to step 114 where the synchronized transmit period flag is examined to see if the synchronized transmission period, or network access arbitration period, is still running. If the access control processor 12 determines at step 114 that the synchronized transmit period flag is still set, the access control processor 12 will know that the end of the network access arbitration period has not yet occurred.

If the synchronized transmit period flag is still set, the waiting access flag will again be examined at step 120 to ensure that the waiting access flag has not been cleared by the timeout interrupt routine. If the synchronized transmit period and waiting access flag both remain set, the transmit window flag is examined to see if it has been set by the transmit window interrupt routine at the occurrence of the assigned access window. If it has not yet been set, the access control processor 12 knows that the assigned access window has not yet arrived, and the routine advances to step 124. The access control processor 12 then clears the transmit go-ahead flag and sets the waiting to transmit flag and then waits while the synchronized transmit period and waiting access flags are set, the transmit window and transmit go-ahead flags are cleared and the carrier sense remains off. When the assigned access window arrives and carrier sense remains off, the transmit window interrupt routine 76 in FIG. 3A will set RTS (Request To Send) to begin transmitting onto the network, set the transmit go-ahead flag and set the transmit window flag. At this time, the access control processor 12 will advance to step 126 where the waiting to transmit flag will be cleared.

The transmit go-ahead flag will then be examined at step 128 and, if it has been set by the transmit window interrupt routine to indicate that the assigned access window has arrived, the access control processor 12 will transmit its frame at step 130.

The transmit frame routine 130 need not be described in detail, since the transmission of data onto the network is well known. However, it should be remembered that part of the transmit frame routine 130 is the generation of the token value which must be included with the transmission. This can be done by merely loading the current token value into register A, subtracting from the contents of register A a value of 1, 2, or whatever the decremental change in the token is to be, and storing the new contents of register A back in the token register. Alternatively, if random token generation is desired, the current token value can be loaded into the register A, the contents of register A can be shifted to the right by one bit position, register B can be loaded with the value of 13 and the contents of registers A and B multiplied. The multiplication results stored in register A can then be incremented by 1, the register contents can then be ANDed with 3F in hexadecimal notation, and the resulting contents of register A can then be shifted leftward by one bit position to obtain the new token value. The new token can then be loaded into the token register.

It should also be noted that the token value can be forced to have even parity by adjusting the value of an otherwise unused bit in the token byte, and the new token can be ignored if it is not detected to have even parity. The token may also be maintained if a required response is not received, thereby giving priority to retransmission.

If the access control processor 12 determines at step 130 that transmit go-ahead flag has not yet been set by the transmit window interrupt routine, e.g., if instead the carrier sense becomes active due to another station gaining access, the PROCESS TX FRAME routine will return via path 132 to a point immediately after step 100.

It should also be noted that, in those instances where the synchronized transmit period flag is found at step 114 to be cleared, the access control processor 12 will know that the network access arbitration period has expired. Accordingly, the routine will advance to steps 132–140 where the access control processor 12 will compute its transmit window number and the count which should be loaded into the counter 62 such that the counter 62 will provide a TC output when the assigned access window arrives, activate RTS to send an all 1's pattern onto the network, deactivates RTS after a predetermined period of time and enables the counter 62. This corresponds to the re-establishment of the network access arbitration period which is generally illustrated in FIG. 2.

In the description given above, the all 1's pattern was transmitted for approximately 150 microseconds, as illustrated at step 138 in FIG. 5A, but some other time period may be preferable.

In either case, the station will begin transmitting its data when its assigned access window arrives, and the access control processor 12 will then monitor the network to determine if a collision has occurred. This collision detection step 142 need not be described in detail, since collision detection is a well known technique. Briefly, however, the first two bytes are received after each is transmitted and are checked for correct source and destination addresses. If they are incorrect, a collision has been detected. If a collision is detected, the routine then returns along path 132 to repeat its attempt to gain access to the network.

If no collision is detected, the access control processor 12 then determines at step 144 whether or not the transmitted frame was a broadcast frame to which no response is expected or was itself a response frame. In either case, the transmission is considered successful, and the routine then advances to step 154.

If the access control processor 12 determines at step 144 that the transmitted frame was not either a broadcast frame or itself a response frame, the network is monitored for the expected response. If no response is obtained, the TXF NO RESPONSE value is decreased by 1 at step 146 and the routine then returns along path 148 to retry its transmission. This can be repeated until the TXF NO RESPONSE value is determined at step 148 to be 0, at which time the register A is set to indicate a "No Response" state and the routine is exited via steps 106–108.

If the access control processor 12 determines that a response has been received, the routine then advances to step 150 where the response is examined to see if the frame has been rejected by the destination station. If so, the TXF REJECTS value is incremented by 1, the access control processor delays, e.g. for a period of time proportional to the square of the number of rejects, and the PROCESS TX FRAME routine then returns via path 148 to retry the transmission. This can be repeated until the number of detected rejects exceeds the maximum allowable number of rejects, as determined at step 152, and the register A is then set to indicate a Frame Reject and the routine is exited via steps 106–108.

Finally, if the access control processor 12 determines at step 150 that the frame has not been rejected, the response is examined to determine if it was a "Not Connected" response. If so, a "Not Connected" indication is loaded into register A and the routine is exited via steps 106–108. Otherwise, an acknowledge response was received and the routine advances to step 154.

At step 154, the processor 12 then determines whether the transmitted frame was a data frame. If so, the link table entry for the particular destination is updated in a known manner to indicate the sequence number of the data frame most recently transmitted to that destination. The data frames are sequentially numbered so that the destination station can differentiate the retransmission of a data frame from the transmission of a new data frame. If the transmitted frame was a control frame, no updating of the link table entry is necessary. In either case, the register A is then set to indicate "OK" and the routine is then exited via steps 106–108 as described above.

It can be seen from the above description that the PROCESS TX FRAME routine is called whenever the external processor 10 desires access to the network, and the receive frame and transmit window interrupt routines will control the setting and clearing of appropriate flags to maintain synchronization with the network. The distribution of available access windows amongst the various stations on the network will substantially reduce the probability of collision, thereby decreasing the frequency of repeated transmissions and aborted communications and resulting in more efficient use of the transmission medium.

As described above, in order to further reduce the possibility of collision, it is advisable upon initialization of any given station to require that that station wait for two synchronization transmit periods before attempting to gain access to the network. This can be done in a relatively simple manner as follows. Upon any station being initialized, the register A can be loaded with a value of 255, and the register B can be loaded with a value corresponding to the transmit window size. The contents of registers A and B can be multiplied together and the 1's complement of the product can be loaded into the timer 62. The transmit window and synchronized transmit period flag can be set and, upon a TC output from the counter 62 indicating that two synchronization periods have elapsed, the synchronized transmit period flag can be cleared and a transmit frame can be sent indicating that this station is initializing.

I claim:

1. In a communications system wherein a plurality of stations each transmit at different times to one another over a shared communications medium, each said station including detection means for detecting the presence or absence of a transmission on said communications medium, a method of controlling access by each station to said communications medium, said method comprising the steps of:
    reserving an arbitration period of time commencing from the termination of each transmission on said medium,;
    dividing said arbitration period into a plurality of access windows;
    assigning unique arbitration addresses to stations sharing said medium;
    generating, at each station desiring access to said medium, an access control number independent of the address of said each station to be transmitted to said medium as part of its communication;
    receiving said access control number at each other station desiring access to said medium and combining said received access control number with the respective assigned address of said each other station to determine one of said plurality of access windows assigned to said each other station during the next arbitration period;
    detecting at each station the termination of a transmission transmitted over said medium;
    generating at each station a new access control number calculated from the current access control number; and
    transmitting said new access control number from any station desiring access to said medium, during its respective access window if no other station has transmitted during a previous access window in the same arbitration period.

2. The method of claim 1 wherein the incremental value added by each terminal is a predetermined constant.

3. The method of claim 2, wherein said predetermined constant is a value greater than 1.

4. The method of claim 1 wherein the incremental value is a variable derived by random number generation.

5. The method of claim 1, wherein at least some of the transmissions are from a transmitting station to a destination station, said stations maintaining the same access window assignments in the next arbitration period if a transmitting station does not receive a response from a receiving station.

6. The method of claim 1, wherein each station includes means for detecting whether the access control number received with a transmission is invalid, and wherein a station uses the old control number if the access control number received with the last transmission is determined to be invalid.

7. In a communications system wherein a plurality of stations each transmit at different times to one another over a shared communications medium, each said station including detection means for detecting the presence or absence of a transmission on said communications medium, a method of controlling access by each station to said communications medium, said method comprising the steps of:
    reserving an arbitration period of time commencing from the termination of each transmission on said medium,;

dividing said arbitration period into a plurality of access windows;

establishing unique arbitration addresses for stations sharing said medium by assigning node addresses to stations in a numerical sequence and developing arbitration addresses from said node addresses by reversing the order of bits in the node addresses, whereby the times allotted to access windows within each arbitration period are spread out in accordance with the number of stations then actually using the medium;

generating, at each station desiring access to said medium, an access control number to be transmitted to said medium as part of its communication;

receiving said access control number at each other station desiring access to said medium and combining said received access control number with the respective assigned address of said each other station to determine one of said plurality of access windows assigned to said each other station during the next arbitration period;

detecting at each station the termination of a transmission transmitted over said medium;

generating at each station a new access control number calculated from the current access control number; and transmitting said new access control number from any station desiring access to said medium, during its respective access window if no other station has transmitted during a previous access window in the same arbitration period.

8. In a communications system wherein a plurality of stations each transmit at different times to one another over a shared communications medium, each said station including detection means for detecting the presence or absence of a transmission on said communications medium, a method of controlling access by each station to said communications medium, said method comprising the steps of:

reserving an arbitration period of time commencing from the termination of each transmission on said medium,;

dividing said arbitration period into a plurality of access windows;

assigning unique arbitration addresses to stations sharing said medium;

generating, at each station desiring access to said medium, an access control number to be transmitted to said medium as part of its communication;

receiving said access control number at each other station desiring access to said medium and combining said received access control number with the respective assigned address of said each other station to determine one of said plurality of access windows assigned to said each other station during the next arbitration period;

detecting at each station the termination of a transmission transmitted over said medium;

generating at each station a new access control number calculated from the current access control number;

transmitting said new access control number from any station desiring access to said medium, during its respective access window if no other station has transmitted during a previous access window in the same arbitration period;

if no station has commenced transmission during said arbitration period, sending no transmissions onto said medium and allowing network arbitration to lapse until a particular station desires access to said medium; and when said particular station desires access to said medium, transmitting a synchronization signal from said particular station for a predetermined period of time, an arbitration period commencing at the termination of said synchronization commencement signal.

9. In a communications system wherein a plurality of active stations each transmit at different times to one another over a shared communications medium, each said station including detection means for detecting the presence or absence of a transmission on said communications medium, a method of controlling access by each station to said communications medium, said method comprising the steps of:

reserving an arbitration period of time commencing from the termination of each transmission on said medium,;

dividing said arbitration period into a plurality of access windows;

assigning unique arbitration addresses to stations sharing said medium;

generating, at each station desiring access to said medium, an access control number to be transmitted to said medium as part of its communication;

receiving said access control number at each other station desiring access to said medium and combining said received access control number with the respective assigned address of said each other station to determine one of said plurality of access windows assigned to said each other station during the next arbitration period;

detecting at each station the termination of a transmission transmitted over said medium;

generating at each station a new access control number calculated from the current access control number;

transmitting said new access control number from any station desiring access to said medium, during its respective access window if no other station has transmitted during a previous access window in the same arbitration period; and upon a station first becoming active, requiring said newly active station to wait for the expiration of two complete network arbitration periods before transmitting in its assigned access window.

* * * * *